US007764284B2

(12) United States Patent
Simard et al.

(10) Patent No.: US 7,764,284 B2
(45) Date of Patent: Jul. 27, 2010

(54) METHOD AND SYSTEM FOR DETECTING AND EVALUATING 3D CHANGES FROM IMAGES AND A 3D REFERENCE MODEL

(75) Inventors: Philippe Simard, Lachine (CA); Louis Simard, Lachine (CA)

(73) Assignee: Simactive Inc., Montreal, Quebec (CA)

(*) Notice: Subject to any disclaimer, the term of this patent is extended or adjusted under 35 U.S.C. 154(b) by 762 days.

(21) Appl. No.: 11/596,896

(22) PCT Filed: May 24, 2005

(86) PCT No.: PCT/CA2005/000789

§ 371 (c)(1),
(2), (4) Date: Nov. 17, 2006

(87) PCT Pub. No.: WO2005/116936

PCT Pub. Date: Dec. 8, 2005

(65) Prior Publication Data

US 2008/0297502 A1    Dec. 4, 2008

(51) Int. Cl.
*G06T 15/00*    (2006.01)
(52) U.S. Cl. .................. 345/420; 345/426; 345/619
(58) Field of Classification Search .......... 345/420, 345/426, 619
See application file for complete search history.

(56) References Cited

U.S. PATENT DOCUMENTS 5,612,735 A * 3/1997 Haskell et al. ............ 348/43
5,619,256 A * 4/1997 Haskell et al. ............ 348/43

OTHER PUBLICATIONS

Simard, P. et al., Proceedings of SPIE Conference on Enhanced and Synthetic Vision, vol. SPIE-4713, pp. 42-49, Jul. 2002.
Simard, P. et al., Proceedings of the British Machine Vision Conference, Cardiff (England), pp. 193-202, 2002.
Simard, P. et al., Proceedings of SPIE Conference on Enhanced and Synthetic Vision, vol. SPIE-4363, pp. 103-111, 2001.

* cited by examiner

*Primary Examiner*—Phu Nguyen
(74) *Attorney, Agent, or Firm*—BCF LLP (57) ABSTRACT

In a method and system for aligning first and second images with a 3D reference model, the first image is gathered from a first viewpoint, the second image is gathered from a second viewpoint and the first and second images are aligned with the 3D reference model. The image alignment comprises computing prediction error information using the first and second images and the 3D reference model, and minimizing the prediction error. A method and system for detecting and localizing 3D changes in a scene use the above method and system for aligning first and second images with a 3D reference model, determine, in response to the prediction error information and for a model feature of the 3D reference model, whether the prediction error is greater than a selected threshold, and identify the model feature as a 3D change when the prediction error is greater than the selected threshold. Finally, in a method and system for evaluating detected 3D changes, the above method and system for detecting and localizing 3D changes in a scene are used, and the importance of the detected 3D changes is evaluated.

52 Claims, 10 Drawing Sheets

METHOD AND SYSTEM FOR DETECTING AND EVALUATING 3D CHANGES FROM IMAGES AND A 3D REFERENCE MODEL

FIELD OF THE INVENTION

The present invention generally relates to a method and system for aligning pairs of images with a 3D reference model. The method and system can also detect, localize and evaluate 3D changes from the images and 3D reference model.

BACKGROUND OF THE INVENTION

Detection of three-dimensional (3D) changes using a plurality of images is a very difficult problem. The main reason is that two-dimensional (2D) data must be used to assess the 3D changes. 3D change detection algorithms fall into three different classes:
1) those based on comparing images with each other;
2) those based on recovering 3D structures from the 2D images and comparing the reconstructions with each other; and
3) those that attempts to directly compare images to a 3D reference model of the scene.

Algorithms of the first class, based on image comparison generally use one image as a reference while another is used to determine if changes have occurred. Unfortunately, intensity changes do not necessarily imply changes in the geometry of the scene: intensity variations might actually be caused by variations in the viewing/illumination conditions or in the reflectance properties of the imaged surfaces. Such algorithms are therefore not robust in general. In addition, they do not permit the evaluation of the importance of 3D changes Algorithms of the second class, based on reconstruction use imaging data to infer the geometry of the scene or, in other words, to construct a 3D model. A comparison is then performed with a 3D model that serves as a reference. Significant differences between the reference model and the 3D reconstruction are considered as changes. Unfortunately, the reconstruction operation amounts to solving the stereo vision problem, a significantly difficult challenge.

Finally, algorithms of the third class directly compare images to a 3D model. The scene integrity is verified by matching image features to model features. The use of features allows the simplification of the comparison between the two different scene representations. Unfortunately, such algorithms suffer from the limitation of only processing very restricted regions of the scene, i.e. those that present the selected features. Therefore, changes that lie outside of these regions cannot be detected.

SUMMARY OF THE INVENTION

To overcome the above discussed drawbacks, the present invention provides a method of aligning first and second images with a 3D reference model, comprising gathering the first image from a first viewpoint, gathering the second image from a second viewpoint, and aligning the first and second images with a 3D reference model. The image alignment comprises computing prediction error information using the first and second images and the 3D reference model, and minimizing the prediction error.

The present invention also relates to a method of detecting and localizing 3D changes in a scene, comprising: the above described method of aligning first and second images with a 3D reference model as defined in claim 1; in response to the prediction error information, determining for a model feature of the 3D reference model whether the prediction error is greater than a selected threshold; and identifying the model feature as a 3D change when the prediction error is greater than the selected threshold.

The present invention is further concerned with a method of evaluating detected 3D changes comprising: the above described method of detecting and localizing 3D changes in a scene; and evaluating the importance of the detected 3D changes.

Also in accordance with the present invention, there is provided a system for aligning first and second images with a 3D reference model, comprising a detector of the first image from a first viewpoint, a detector of the second image from a second viewpoint, an image aligning computer to align the first and second images with a 3D reference model. The image aligning computer computes prediction error information using the first and second images and the 3D reference model and minimizes the prediction error.

Further in accordance with the present invention, there is provided a system for detecting and localizing 3D changes in a scene, comprising the above described system for aligning first and second images with a 3D reference model, a test device which, in response to the prediction error information, determines for a model feature of the 3D reference model whether the prediction error is greater than a selected threshold, and an identifier of the model feature as a 3D change when the prediction error is greater than the selected threshold.

Still further in accordance with the present invention there is provided a system for evaluating detected 3D changes comprising the above described system for detecting and localizing 3D changes in a scene, and an evaluator of the importance of the detected 3D changes.

The foregoing and other objects, advantages and features of the present invention will become more apparent upon reading of the following non-restrictive description of illustrative embodiments thereof, given by way of example only with reference to the accompanying drawings.

DETAILED DESCRIPTION OF THE ILLUSTRATIVE EMBODIMENTS

Figure 1:
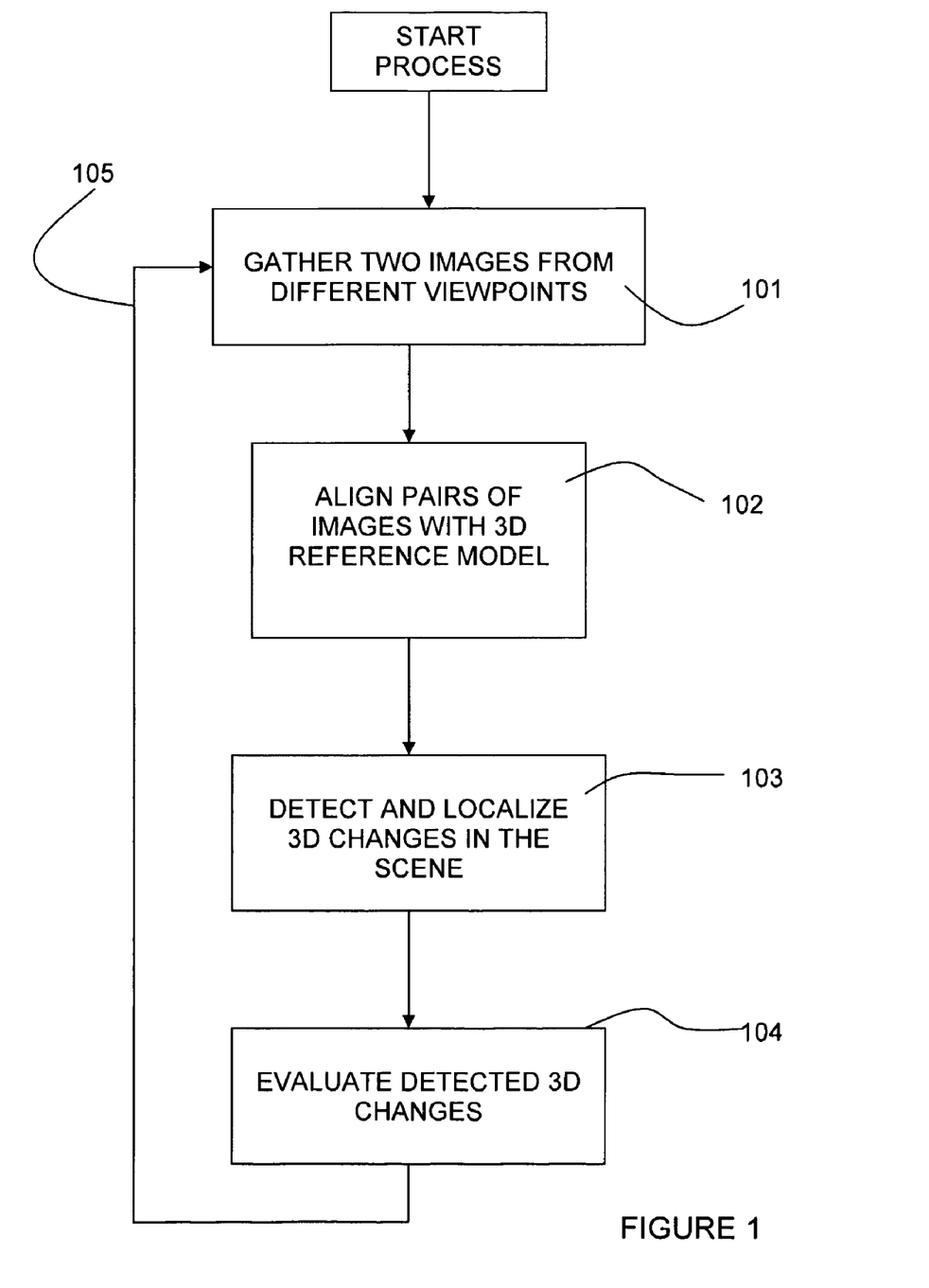
FIG. 1 is a flowchart illustrating a method according to an illustrative embodiment of the present invention to align images on a 3D model, to detect and localize 3D changes in a scene and to evaluate 3D changes in the scene, the method using a 3D reference model.

FIG. 1 is a flowchart illustrating a method according to one embodiment of the present invention to align images on a 3D model, to detect and localize 3D changes in a scene, and evaluate 3D changes in the scene. The method of FIG. 1 is based on a 3D reference model of the images and scene. The method relies on a predictive strategy where predicted images are rendered and compared with observed images. Prediction error maps are generated by calculating local prediction intensity errors.

Operation 101 (FIG. 1)

The method of FIG. 1 is iterative and uses a sequence of images processed in pairs. At any given iteration, a pair of images gathered from two different viewpoints is used. The images should overlap to cover a common region of the scene. For example, the two images of a pair can either be gathered by a single image detector, for example a single camera or simultaneously by two image detectors, for example two cameras (see 201 in FIG. 2). In the former case (single camera), the geometry of the scene is assumed to remain the same during the acquisition process.

The method is sensor independent and can cope with any type of images. The pose of the camera(s) relative to the 3D model (i.e. position and attitude) is assumed to be approximately known from either some pose determination algorithm or position/attitude sensors such as GPS/INS (Global Positioning System/Inertial Navigation System).

Operation 102 (FIG. 1)

An image aligning computer 202 (FIG. 2) aligns the two images of a given pair with the 3D reference model by refining their associated poses. This operation is done carefully since a misalignment could result in erroneous detection results. The alignment is performed by computing and, then, minimizing a prediction error map as will be described hereinbelow with reference to FIG. 4.

Operation 103 (FIG. 1)

A detector 203 (FIG. 2) detects and localizes 3D changes in the scene. These 3D changes correspond to differences between the 3D reference model and the scene represented by the images. These 3D changes are detected based on the assumption that significant prediction errors, i.e. differences between the gathered or acquired images and the 3D model, are caused by geometric differences between the model and the scene. As explained in the following description, the detection is done in the image plane and additional operations are performed to identify the corresponding 3D locations.

Operation 104 (FIG. 1)

An evaluator 204 (FIG. 2) evaluates the importance of the detected 3D changes. As for the alignment operation, this is performed by determining the required variation (or change) in the model parameters to minimize local prediction errors.

Once a given pair of images has been processed, the whole process is repeated as shown by the arrow 105 (FIG. 1). If locations previously identified as changes are identified once again, their previously determined importance is further refined. This can be the case where, for example, new information is gathered.

Figure 3:
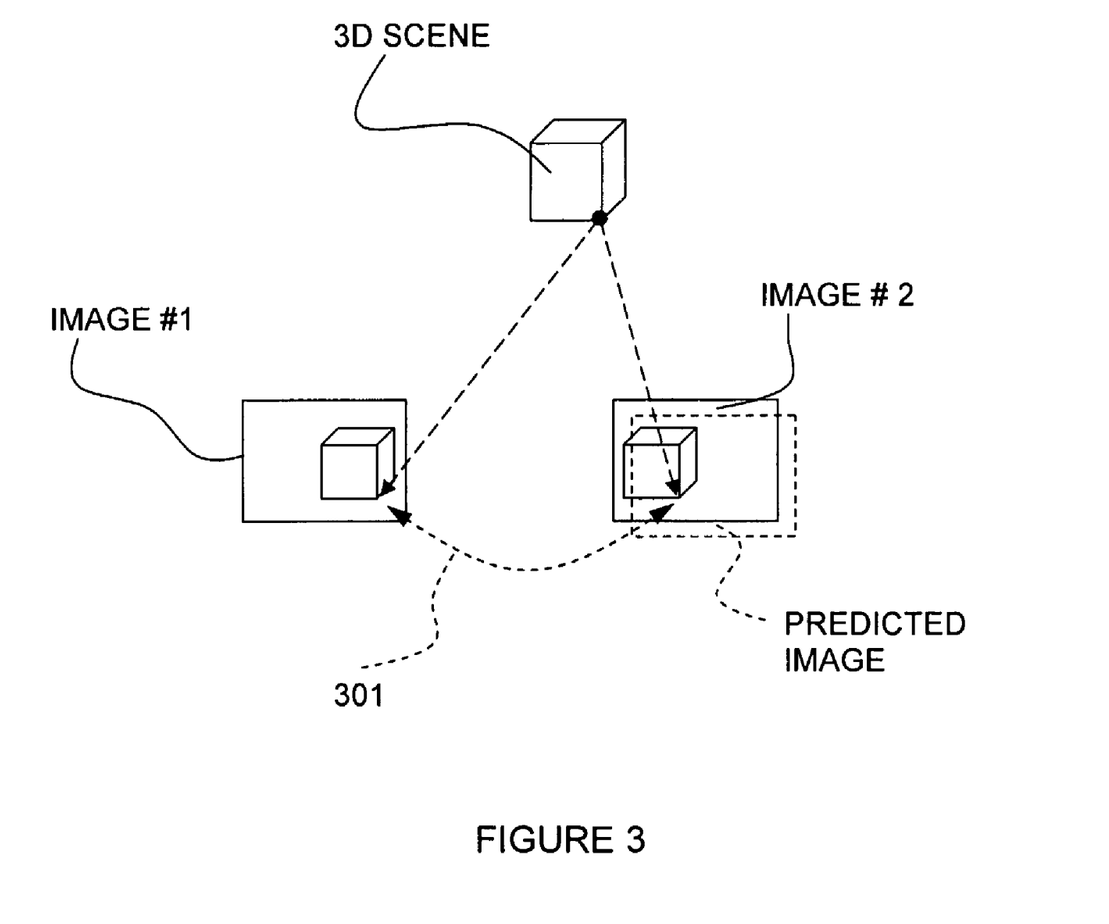
FIG. 3 is a schematic representation of an exemplary imaging set-up.

As outlined in the foregoing description, the method relies on a predictive strategy where image predictions are generated. FIG. 3 presents an imaging setup. A first image of the scene (image #1) is gathered from an arbitrary viewpoint by the image detector, for example camera 201. The camera 201 is then moved and another image is captured (image #2). It should be noted that in the case where a pair of image detectors such as cameras 201 is used, the two images could be gathered simultaneously. A predicted image is rendered based on image #1, the 3D model and the known variation in viewpoint. Assuming that the 3D model is a correct geometric representation of the reality, a predicted image will correspond to image #2 gathered from the second viewpoint.

Figure 2:
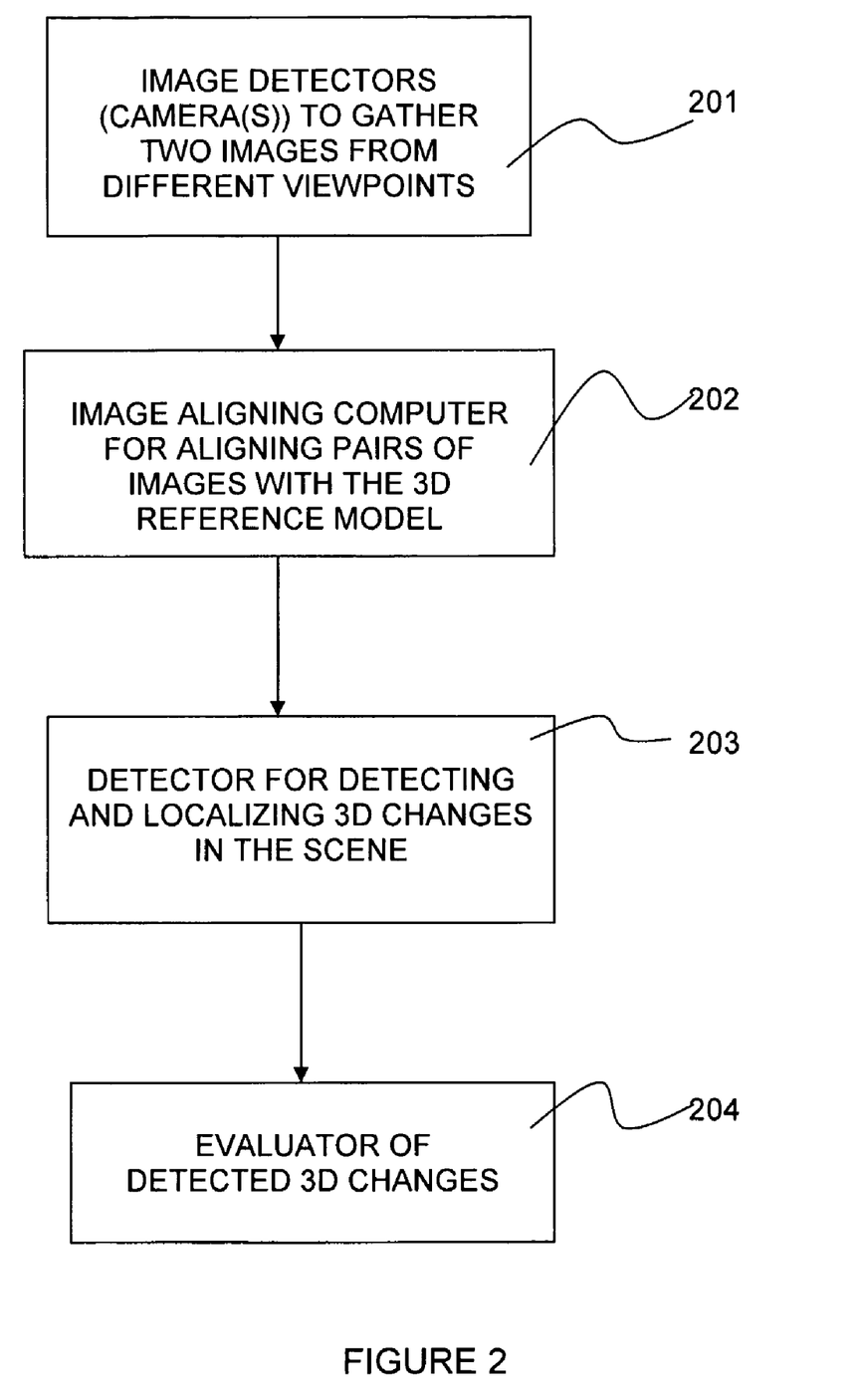
FIG. 2 is a schematic block diagram of an non-restrictive, illustrative system for implementing the method of FIG. 1.
Figure 4:
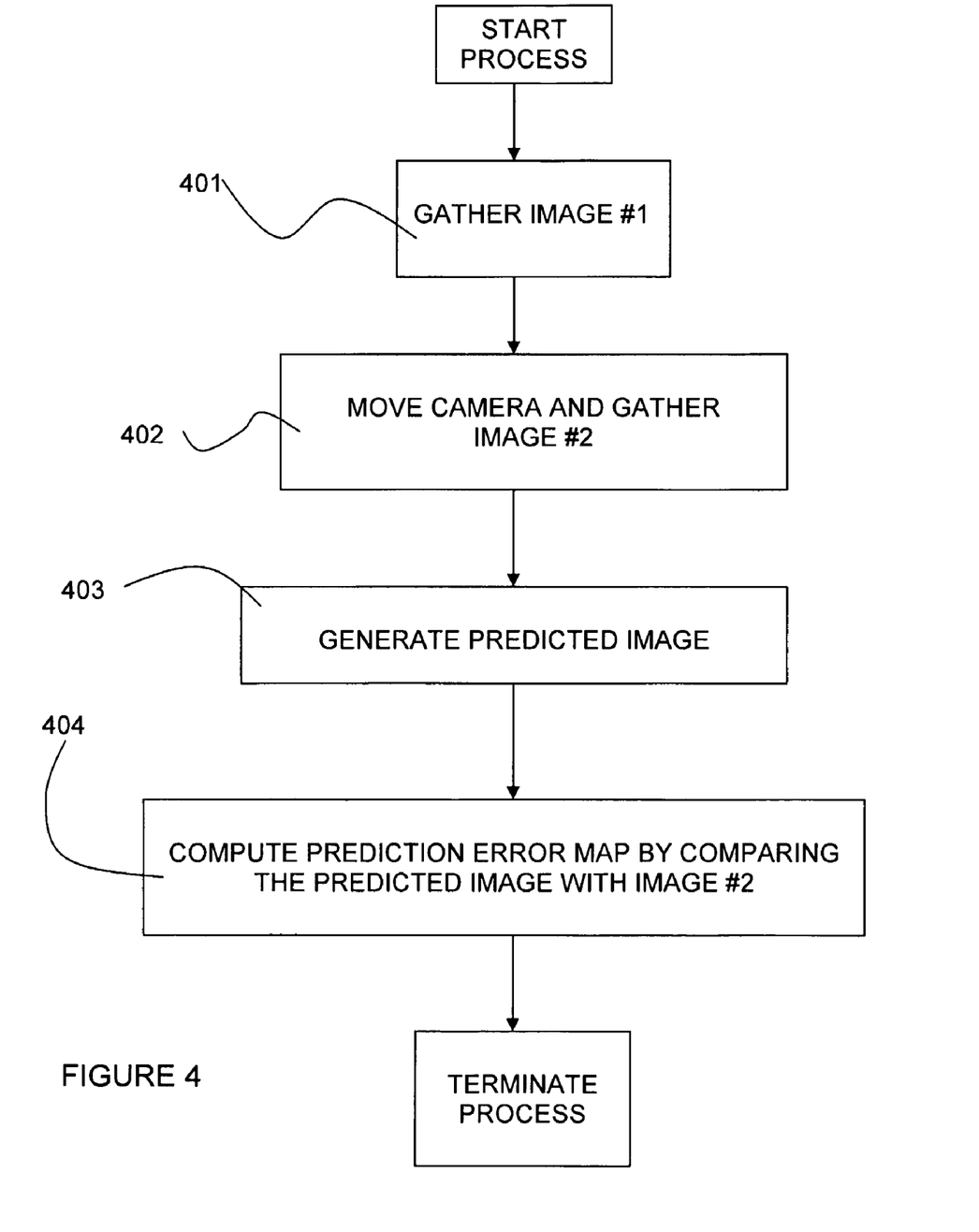
FIG. 4 is a flowchart illustrating a non limitative procedure to generate a prediction error map.

FIG. 4 is a flowchart illustrating how operation 102 of FIG. 1 and the image aligning computer 202 computes a prediction error map.

Operations 401 and 402 (FIG. 4)

Image #1 is gathered from a first viewpoint using an image detector, such as camera 201. Camera 201 is then moved to a second viewpoint to gather image #2.

Operation 403 (FIG. 4)

Figure 5:
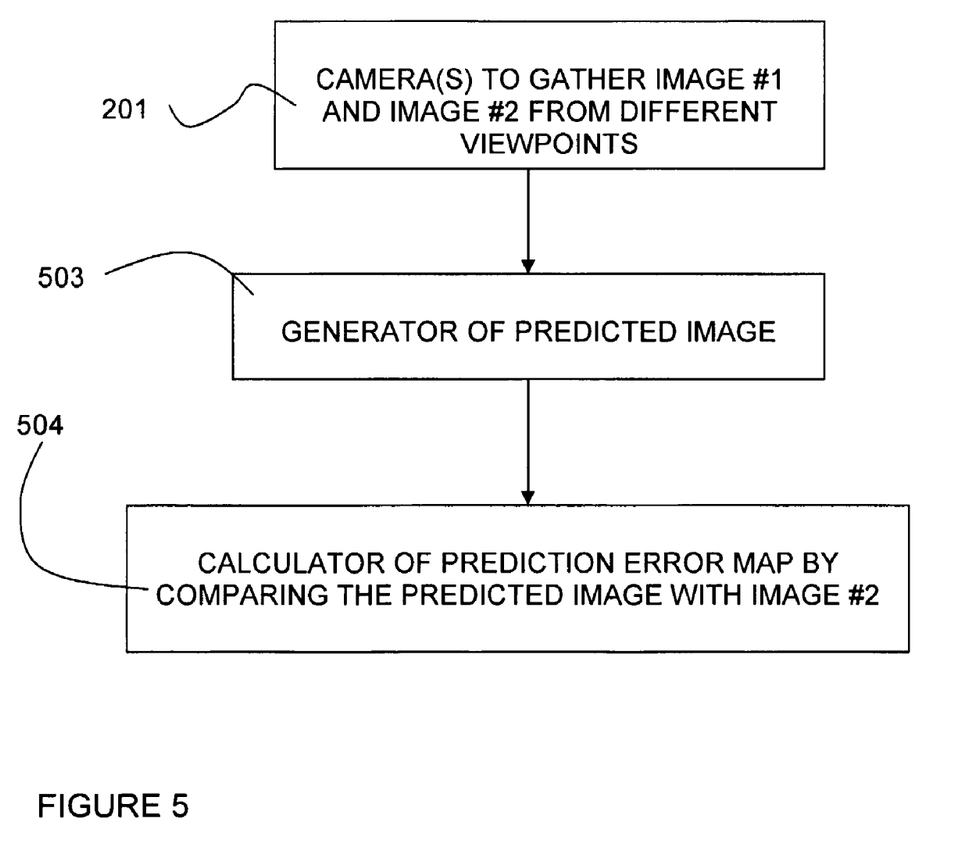
FIG. 5 is a schematic block diagram of a device for implementing the procedure of FIG. 4.

A predicted image generator 503 (FIG. 5) first determines which pixel of image #2 will correspond to the same scene element as represented by a given pixel of image #1 (see 301 in FIG. 3). Using the 3D reference model, the generator 503 produces a predicted image by determining for each pixel of image #1 the predicted pixel position in the predicted image knowing:

1) the geometry of the scene (or approximate geometry, as the 3D reference model might contain discrepancies), thus the coordinates of the 3D point corresponding to the pixel of image #1;
2) the pose of the camera (at both viewpoints) relative to this 3D point.

The pixel position in image #2 where the 3D point should appear can be calculated by the generator 503 based on standard projective geometry principles. The projective geometry of the camera is assumed to be known; for example, a standard calibration procedure can be used prior to the process.

Once the pixel correspondence is established, the predicted image per se is rendered. This is made by using the pixel intensity of each point as measured from the first viewpoint and modulating it by a factor corresponding to the change in viewpoint. The 3D reference model is assumed to contain reflectance information that models how the measured pixel intensity of a given surface varies as a function of a change in the viewpoint. If the 3D model does not contain such information, a brightness constancy assumption can be used. In the latter case, the predicted intensity is simply equal to the intensity value measured from the first viewpoint.

Operation 404 (FIG. 4)

A calculator 504 (FIG. 5) finally computes and generates the prediction error map by comparing the predicted image with image #2 gathered from the second viewpoint. For that purpose, local intensity differences between the predicted image and image #2 are calculated. For example, the absolute value of the difference between two corresponding pixel intensities can be used. More complex correlation scores can also be employed.

The alignment of the two images (operation 102) with the 3D reference model involves the refinement of the two initial pose estimates associated with the two viewpoints as measured by some device or technique to minimize the prediction error. Any optimization procedure can be used to that effect, but those having a better capability to recover global minima have been found adequate.

Figure 6:
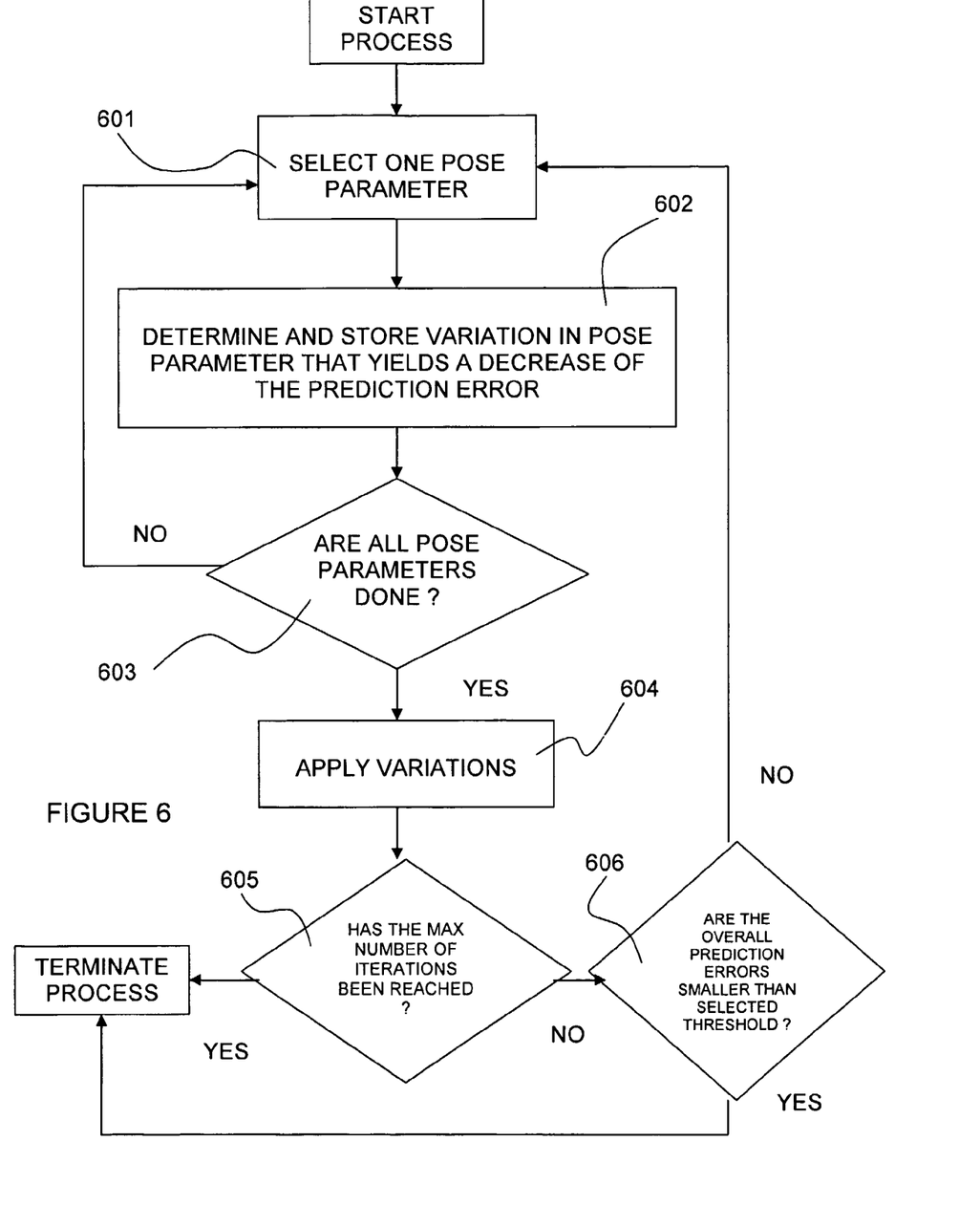
FIG. 6 is a flowchart illustrating an example of refinement of pose estimates.

FIG. 6 is a flowchart illustrating an example of refinement of pose estimates.

Operation 601 (FIG. 6)

One particular pose parameter is arbitrarily selected, e.g. x, y, z, roll, pitch or yaw associated with either the first or second viewpoint.

Operation 602 (FIG. 6)

The variation in the selected pose parameter that yields a reduction in the prediction error is determined and stored.

Operation 603 (FIG. 6)

A test is then performed to assess if all pose parameters were processed. If not, another pose parameter is selected (Operation 601) and the procedure is repeated.

Operation 604 (FIG. 6)

Once all the variations of the pose parameters yielding to a decrease of the prediction error have been computed, the variations are applied to the pose parameters to update these pose parameters accordingly. This alignment process is repeated each time a new image pair becomes available.

Operations 605 and 606 (FIG. 6)

A test (Operation 605) is then performed to assess if a pre-selected maximum number of pose refinement iterations has been reached. If the maximum number of pose refinement iterations has been reached, the alignment process terminates. If not, a test (Operation 606) is then performed to assess if prediction errors are smaller than a predetermined minimum criterion, for example a selected threshold. A global score is used and should reflect the overall amount of prediction errors, but should also take into account that some prediction errors may be due to 3D changes. For example, the summation of local errors can be used. The minimum criterion should either reflect the desired sensitivity or the precision at which image predictions can be generated (the precision is dependent on the different system uncertainties such as camera calibration errors). If the global score is smaller than the minimum criterion, the alignment process terminates. If not, the pose estimates are further refined in order to minimize prediction errors (return to operation 601).

The detection of 3D change involves the comparison of the predicted image and image #2 gathered from the second viewpoint. If they present significant differences, the corresponding 3D locations are identified as changes.

Figure 7:
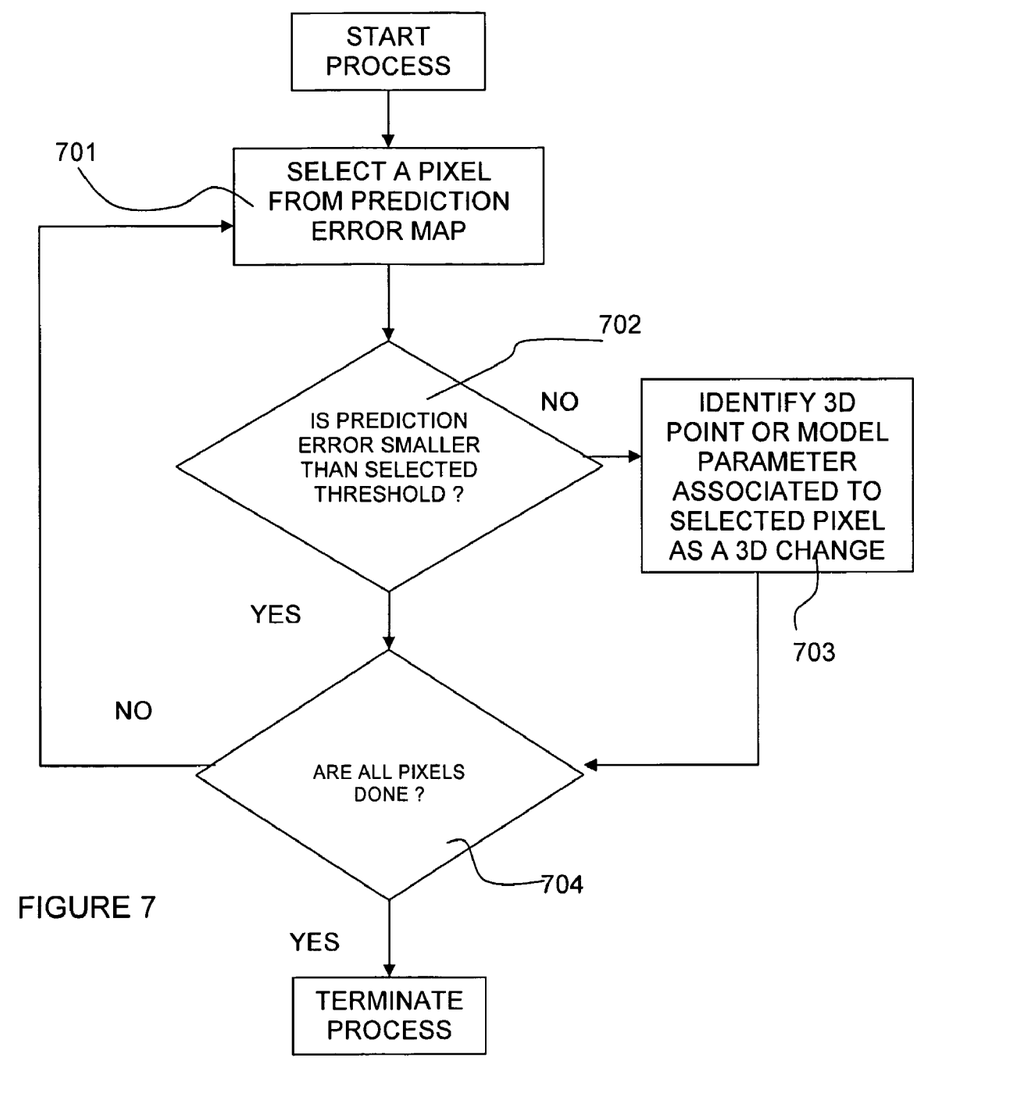
FIG. 7 is a flowchart illustrating a non limitative procedure to detect and localize 3D changes in a scene.

FIG. 7 is a flowchart illustrating how to conduct operation 103 of FIG. 1 and use detector 203 of FIG. 2 for detecting and localizing 3D changes in the scene.

Operation 701 (FIG. 7)

Once the images are precisely aligned with the 3D model, the final prediction error map is used for detecting 3D changes. A selector 801 (FIG. 8) selects a pixel from the prediction error map.

Operation 702 (FIG. 7)

Figure 8:
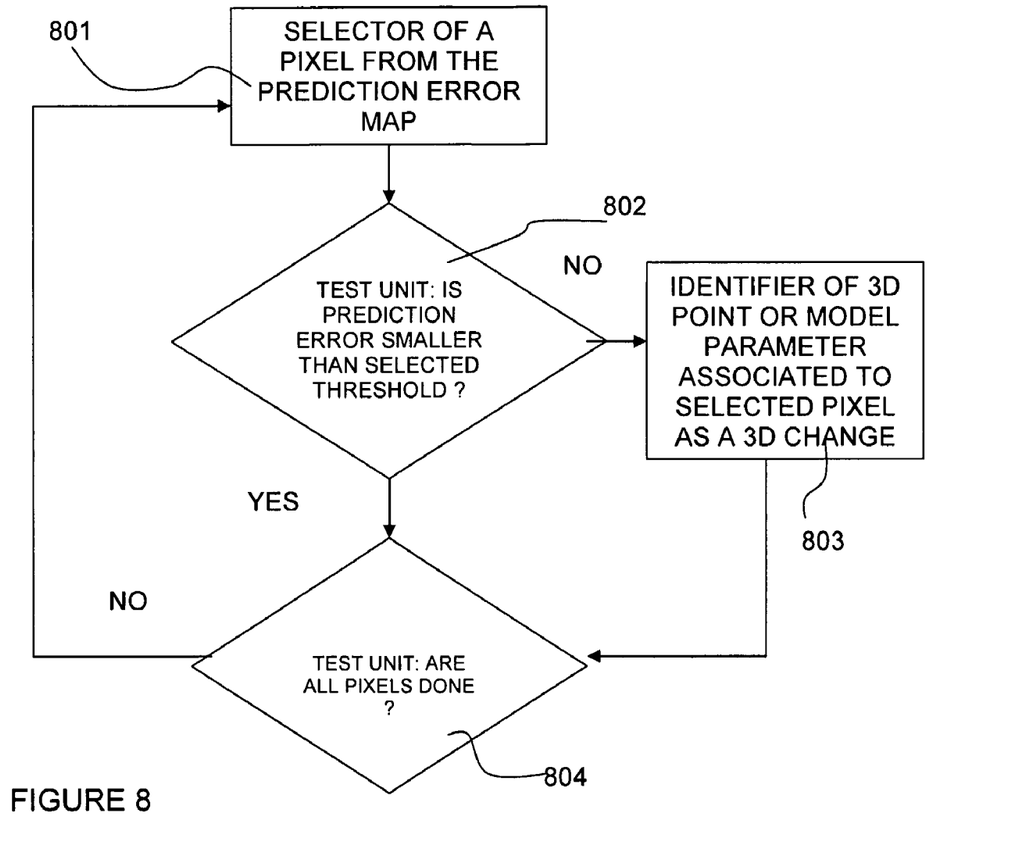
FIG. 8 is a schematic block diagram showing a system for implementing the procedure of FIG. 7.

For each pixel of the prediction error map, a test unit 802 performs a test to determine whether the prediction error is smaller or greater than a selected threshold. As for the alignment process, the threshold is chosen to either reflect the desired sensitivity or the precision at which the predicted images can be generated.

Operation 703 (FIG. 7)

If the prediction error is greater than the selected threshold, then an identifier 803 flags the 3D point of the 3D reference model associated with the given pixel as a 3D change. If the surface is defined by control parameters, some further processing is performed. An example of a parameterization is a digital elevation map where a finite set of control elevation values are arranged along a rectangular grid: intermediate elevation values between adjacent control points can be generated by interpolation using triangles. In that case, the closest elevation control point could be identified as a 3D change. If the prediction error (Operation 702) is smaller than the selected threshold, then the 3D point is assumed to be correct implying that there is no difference between the world and the model geometry at that location.

Operation 704 (FIG. 7)

The change detection process is repeated until all the pixels of the prediction error map have been processed. This test is performed by a test unit 804 (FIG. 8).

Evaluation (Operation 104 of FIG. 1 and evaluator 204 of FIG. 2) of the detected 3D changes will now be described with reference to FIGS. 9 and 10.

The evaluation of the importance of the 3D changes involves calculating the required variation of the 3D point (or control parameter in the case of a parameterized shape) that minimizes the prediction error. As for the alignment operation 102 (FIG. 1), any optimization procedure can be used to that effect but those having a better capability to recover global minima should be preferred.

Figure 9:
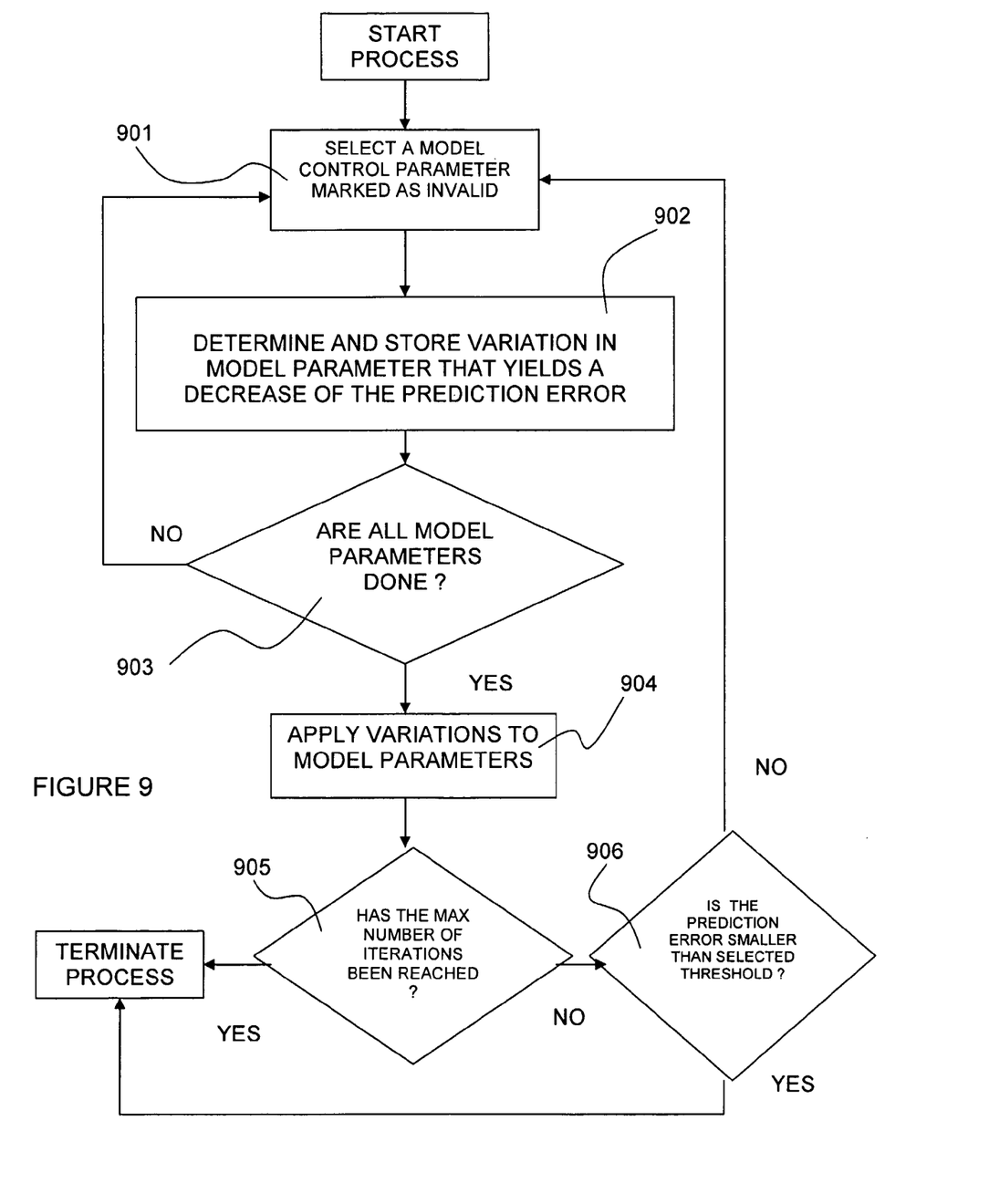
FIG. 9 is a flowchart illustrating an example of procedure to evaluate the importance of a 3D change.
Figure 10:
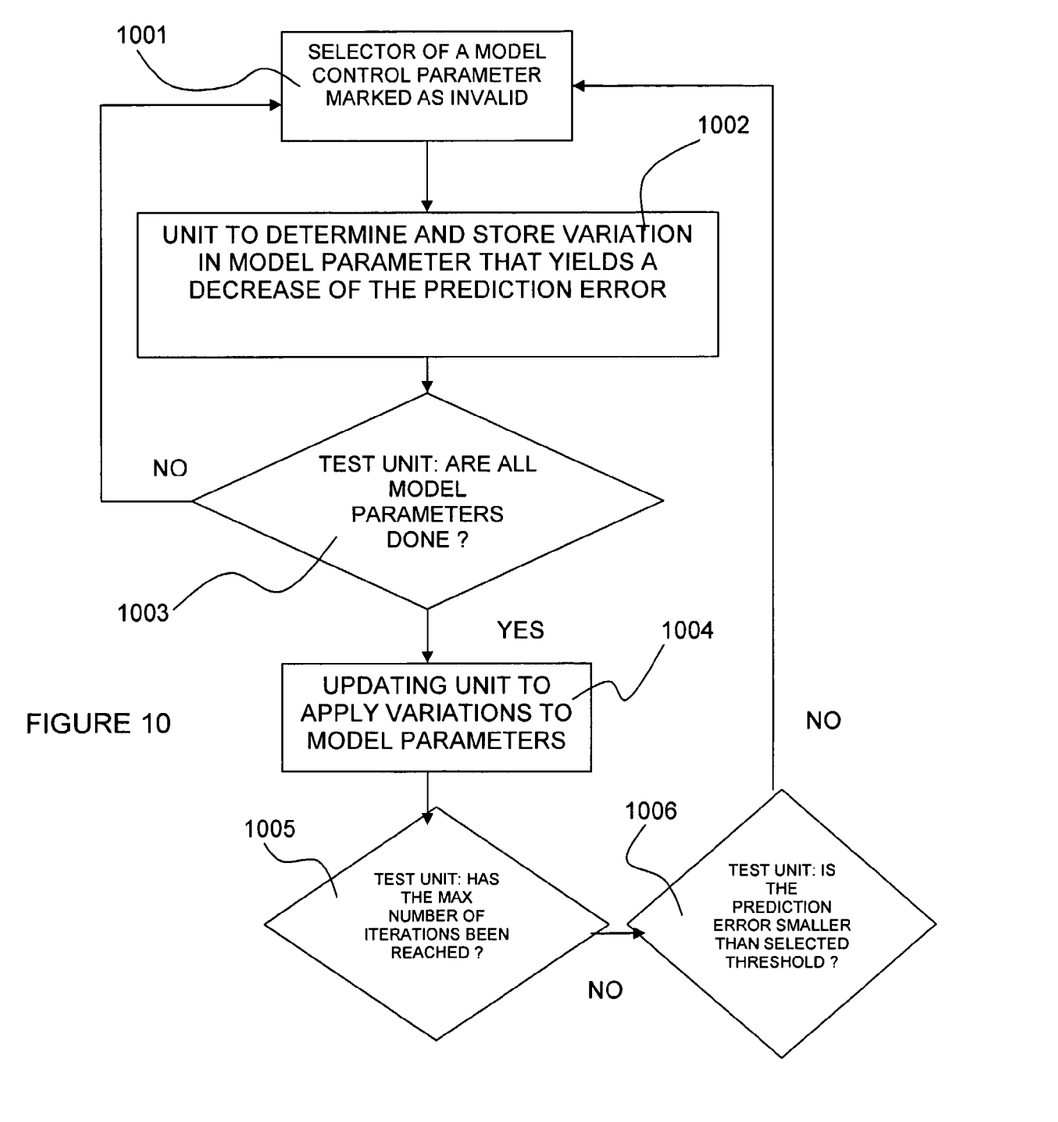
FIG. 10 is a schematic block diagram of a system for implementing the procedure of FIG. 9.

FIG. 9 is a flowchart illustrating an example of evaluation of the importance of a 3D change.

Operation 901 (FIG. 9)

A selector 1001 (FIG. 10) arbitrarily selects one particular model control parameter (or 3D model point(s) if the 3D reference model is not parameterized and only consists of a set of 3D points) that was identified as 3D change by the change detection operation 103 of FIG. 1.

Operation 902 (FIG. 9)

A unit 1002 (FIG. 10) determines and store the variation in the selected model parameter (or 3D point) that produces a decrease or reduction in the prediction error.

Operation 903 (FIG. 9)

A test unit 1003 (FIG. 10) performs a test to assess if all model parameters (or 3D points) were processed. If not, we return to operation 901 and another parameter is selected and the procedure is repeated.

Operation 904 (FIG. 9)

Once all the variations of the model parameters (or 3D points) yielding to a decrease of the prediction error have been computed (Operation 902), an updating unit 1004 (FIG. 10) apply the variations to the model parameters (or 3D points) to update (or refine) these parameters (or 3D points) accordingly.

Operation 905 (FIG. 9)

A test unit 1005 (FIG. 10) then assesses whether a pre-selected maximum number of parameter or point refinement iterations has been reached or not. If yes, the process is terminated.

Operation 906 (FIG. 9)

If the test unit 1005 determines that the pre-selected maximum number of refinement iterations has not been reached, a test unit 1006 (FIG. 10) assesses if the prediction error is smaller than a predetermined minimum criterion. For example, the predetermined minimum criterion is a preselected threshold. Local scores are used and should reflect the local amount of prediction errors. The minimum criterion should either reflect the desired sensitivity or the precision at which image predictions can be generated (the precision is dependent on the different system uncertainties such as camera calibration errors). If a local score is smaller than the minimum criterion, the evaluation process terminates for the associated model parameter. If not, the iterative process returns to operation 901 and is repeated.

Once the importance of the 3D changes (i.e. the variations of the model parameters required to minimize prediction errors) has been determined, the model parameters are set back to their original values. The final output of the system is thus the set of detected 3D changes, along with their location and importance. If the goal is to update the 3D model, the changes can then be incorporated to this 3D model.

Potential applications of the present invention include for example:

Scene monitoring, for example navigation assistance, inspection, obstacle detection, disaster management, surveillance/reconnaissance, target/threat detection, camouflage detection, assessment of battlefield damages/results;

Model updating, for example 3D mapping, special effects, computer-aided design; and Refinement of pose estimates, for example improvement of position/attitude sensor measurements, registration of 2D images to 3D data for the production of orthophotos.

Although the present invention has been described hereinabove by way of illustrative embodiments thereof, it can be modified at will within the scope of the appended claims without departing from the spirit and nature of the subject invention.

What is claimed is:

1. A method of aligning first and second images of a 3D scene with a 3D reference model of the 3D scene, comprising:
   gathering the first image of the 3D scene from a first viewpoint;
   gathering the second image of the 3D scene from a second viewpoint;
   aligning the first and second images with the 3D reference model, the image alignment comprising:
      computing by means of a computer prediction error information between the first image, the second image and the 3D reference model; and
      minimizing by the computer the prediction error information by refining pose estimates associated with the first and second viewpoints.

2. The method of aligning first and second images with a 3D reference model as defined in claim 1, wherein:
   the first and second images overlap to cover a common region of the 3D scene.

3. The method of aligning first and second images with a 3D reference model as defined in claim 1, wherein:
   computing by means of the computer prediction error information comprises computing a prediction error map; and
   minimizing by the computer the prediction error comprises minimizing the prediction error map.

4. The method of aligning first and second images with a 3D reference model as defined in claim 1, wherein computing by means of the computer prediction error information comprises:
   generating a predicted image in response to the first image and the 3D reference model; and
   computing a prediction error map by comparing the predicted image with the second image.

5. The method of aligning first and second images with a 3D reference model as defined in claim 4, wherein:
   the first image and the predicted image comprise pixels; and
   generating a predicted image comprises determining for each pixel of the first image a predicted pixel position and a predicted pixel intensity in the predicted image, using the 3D reference model.

6. The method of aligning first and second images with a 3D reference model as defined in claim 4, wherein comparing the predicted image with the second image comprises:
   calculating by means of the computer local intensity differences between the predicted image and the second image.

7. The method of aligning first and second images with a 3D reference model as defined in claim 1, wherein refining pose estimates comprises:
   selecting one pose parameter;
   determining a variation in the selected pose parameter that yields a reduction in the prediction error.

8. The method of aligning first and second images with a 3D reference model as defined in claim 7, comprising repeating the operations of selecting one pose parameter and determining a variation in the selected pose parameter until every pose parameter amongst a plurality of pose parameters have been processed.

9. The method of aligning first and second images with a 3D reference model as defined in claim 8, wherein refining pose estimates comprises:
   applying the determined variations to the pose parameters in order to update said pose parameters.

10. The method of aligning first and second images with a 3D reference model as defined in claim 9, further comprising:
    testing whether a maximum number of pose refinement iterations has been reached; and
    terminating alignment of the first and second images when the maximum number of pose refinement iterations has been reached.

11. The method of aligning first and second images with a 3D reference model as defined in claim 10, wherein refining pose estimates comprises, when the maximum number of pose refinement iterations has not been reached:
    testing whether overall prediction errors are smaller than a predetermined minimum criterion; and
    terminating alignment of the first and second images when the overall prediction errors are smaller than the predetermined minimum criterion.

12. The method of aligning first and second images with a 3D reference model as defined in claim 7, wherein refining pose estimates comprises:
    applying the determined variation to the selected pose parameter in order to update said pose parameter.

13. A method of detecting and localizing 3D changes in a 3D scene, comprising:
    the method of aligning first and second images with a 3D reference model as defined in claim 1;
    in response to the prediction error information, determining for a model feature of the 3D reference model whether the prediction error is greater than a selected threshold; and
    identifying the model feature as a 3D change when the prediction error is greater than the selected threshold.

14. The method for detecting and localizing 3D changes in a scene as defined in claim 13, wherein the model feature is selected from the group consisting of 3D points or model control parameters of the 3D reference model.

15. The method of detecting and localizing 3D changes in a 3D scene as defined in claim 13, wherein:
    computing by means of the computer prediction error information comprises computing a prediction error map having pixels.

16. The method of detecting and localizing 3D changes in a 3D scene as defined in claim 15, wherein determining for a model feature of the 3D reference model whether the prediction error is greater than a selected threshold comprises:
    selecting a pixel from the prediction error map; and
    for the selected pixel of the prediction error map, determining whether the prediction error is greater than the selected threshold.

17. The method of detecting and localizing 3D changes in a 3D scene as defined in claim 16, wherein identifying the model feature as a 3D change comprises:

identifying a model feature of the 3D reference model associated with the selected pixel as a 3D change when the prediction error is greater than the selected threshold.

18. The method of detecting and localizing 3D changes in a 3D scene as defined in claim 17, comprising repeating the operations of selecting a pixel from the prediction error map, determining whether the prediction error is greater than the selected threshold, and identifying a model feature until all the pixels of the prediction error map have been processed.

19. A method of evaluating detected 3D changes comprising:

the method of detecting and localizing 3D changes in a 3D scene as defined in claim 13; and evaluating the importance of the detected 3D changes.

20. The method of evaluating detected 3D changes as defined in claim 19, wherein evaluating the importance of the detected 3D changes comprises:

selecting a model feature of the 3D reference model; and determining a variation in the selected model feature that produces a decrease in the prediction error.

21. The method of evaluating detected 3D changes as defined in claim 20, wherein the model feature is selected from the group consisting of 3D points or model control parameters of the 3D reference model.

22. The method of evaluating detected 3D changes as defined in claim 20, wherein evaluating the importance of the detected 3D changes comprises:

repeating the operations of selecting a model feature of the 3D reference model and determining a variation in the selected model feature that produces a decrease in the prediction error until all model features amongst a plurality of model features have been processed.

23. The method of evaluating detected 3D changes as defined in claim 22, further comprising applying the determined variations to the model features in order to refine said model features.

24. The method of evaluating detected 3D changes as defined in claim 23, further comprising:

testing whether a maximum number of model feature refinement iterations has been reached; and terminating the evaluation of the detected 3D changes when the maximum number of model feature refinement iterations has been reached.

25. The method of evaluating detected 3D changes as defined in claim 23, further comprising, when the maximum number of pose refinement iterations has not been reached:

testing whether the prediction error is smaller than a selected threshold; and terminating evaluation of the detected 3D changes when the prediction error is smaller than the selected threshold.

26. The method of evaluating detected 3D changes as defined in claim 20, further comprising applying the determined variation to the selected model feature in order to refine said model feature.

27. A system for aligning first and second images with a 3D reference model, comprising:

a detector of the first image from a first viewpoint;

a detector of the second image from a second viewpoint;

an image aligning computer to align the first and second images with a 3D reference model, wherein the image aligning computer:

computes prediction error information using the first image, the second image and the 3D reference model; and minimizes the prediction error information by refining pose estimates associated with the first and second viewpoints.

28. The system for aligning first and second images with a 3D reference model as defined in claim 27, wherein:

the first and second images overlap to cover a common region of the scene.

29. The system for aligning first and second images with a 3D reference model as defined in claim 27, wherein:

the prediction error information comprises a prediction error map; and the image aligning computer minimizes the prediction error by minimizing the prediction error map.

30. The system for aligning first and second images with a 3D reference model as defined in claim 27, wherein the image aligning computer comprises:

a generator of a predicted image in response to the first image and the 3D reference model; and a calculator of a prediction error map by comparing the predicted image with the second image.

31. The system for aligning first and second images with a 3D reference model as defined in claim 30, wherein:

the first image and the predicted image comprise pixels; and the generator of a predicted image determines for each pixel of the first image a predicted pixel position and a predicted pixel intensity in the predicted image, using the 3D reference model.

32. The system for aligning first and second images with a 3D reference model as defined in claim 30, wherein the calculator of a prediction error map calculates local intensity differences between the predicted image and the second image.

33. The system for aligning first and second images with a 3D reference model as defined in claim 27, wherein, to refine pose estimates, the image aligning computer:

selects one pose parameter; and determines a variation in the selected pose parameter that yields a reduction in the prediction error.

34. The system for aligning first and second images with a 3D reference model as defined in claim 33, wherein the image aligning computer repeats the operations of selecting one pose parameter and determining a variation in the selected pose parameter until every pose parameter amongst a plurality of pose parameters have been processed.

35. The system for aligning first and second images with a 3D reference model as defined in claim 34, wherein, to refine pose estimates, the image aligning computer applies the determined variations to the pose parameters in order to update said pose parameters.

36. The system for aligning first and second images with a 3D reference model as defined in claim 33, wherein, to refine pose estimates, the image aligning computer applies the determined variation to the selected pose parameter in order to update said pose parameter.

37. The system for aligning first and second images with a 3D reference model as defined in claim 33, wherein the image aligning computer further:

tests whether is maximum number of pose refinement iterations has been reached; and terminates alignment of the first and second images when the maximum number of pose refinement iterations has been reached.

38. The system for aligning first and second images with a 3D reference model as defined in claim 37, wherein, to refine pose estimates, the image aligning computer, when the maximum number of pose refinement iterations has not been reached:
  tests whether overall prediction errors are smaller than a predetermined minimum criterion; and
  terminates alignment of the first and second images when the overall prediction errors are smaller than the predetermined minimum criterion.

39. A system for detecting and localizing 3D changes in a scene, comprising:
  the system for aligning first and second images with a 3D reference model as defined in claim 27;
  a test device which, in response to the prediction error information, determines for a model feature of the 3D reference model whether the prediction error is greater than a selected threshold; and
  an identifier of the model feature as a 3D change when the prediction error is greater than the selected threshold.

40. The system for detecting and localizing 3D changes in a scene as defined in claim 39, wherein the model feature is selected from the group consisting of 3D points or model control parameters of the 3D reference model.

41. The system for detecting and localizing 3D changes in a scene as defined in claim 39, wherein:
  the prediction error information comprises a prediction error map having pixels.

42. The system for detecting and localizing 3D changes in a scene as defined in claim 41, wherein the test device comprises:
  a selector of a pixel from the prediction error map; and
  a test unit which, for the selected pixel of the prediction error map, determines whether the prediction error is greater than the selected threshold.

43. The system for detecting and localizing 3D changes in a scene as defined in claim 42, wherein the identifier of the model feature as a 3D change:
  identifies a model feature of the 3D reference model associated with the selected pixel as a 3D change when the prediction error is greater than the selected threshold.

44. The system for detecting and localizing 3D changes in a scene as defined in claim 43, comprising means for repeating the operations carried out by the selector of a pixel from the prediction error map, the test unit determining whether the prediction error is greater than the selected threshold, and the identifier of a model feature until all the pixels of the prediction error map have been processed.

45. A system for evaluating detected 3D changes comprising:
  the system for detecting and localizing 3D changes in a scene as defined in claim 39; and
  an evaluator of the importance of the detected 3D changes.

46. The system for evaluating detected 3D changes as defined in claim 45, wherein the evaluator of the importance of the detected 3D changes comprises:
  a selector of a model feature of the 3D reference model; and
  a unit which, in operation, determines a variation in the selected model feature that produces a decrease in the prediction error.

47. The system for evaluating detected 3D changes as defined in claim 46, wherein the model feature is selected from the group consisting of 3D points or model control parameters of the 3D reference model.

48. The system for evaluating detected 3D changes as defined in claim 46, wherein the evaluator of the importance of the detected 3D changes comprises:
  means for repeating the operations carried out by the selector of a model feature of the 3D reference model and the unit that determines a variation in the selected model feature that produces a decrease in the prediction error until all model features amongst a plurality of model features have been processed.

49. The system for evaluating detected 3D changes as defined in claim 48, further comprising an updating unit which applies the determined variations to the model features in order to refine said model features.

50. The system for evaluating detected 3D changes as defined in claim 49, further comprising:
  a test unit which, in operation, tests whether a maximum number of model feature refinement iterations has been reached; and
  means for terminating the evaluation of the detected 3D changes when the maximum number of model feature refinement iterations has been reached.

51. The system for evaluating detected 3D changes as defined in claim 49, further comprising, when the maximum number of pose refinement iterations has not been reached:
  a test unit which, in operation, tests whether the prediction error is smaller than a selected threshold; and
  means for terminating evaluation of the detected 3D changes when the prediction error is smaller than the selected threshold.

52. The system for evaluating detected 3D changes as defined in claim 46, further comprising an updating unit which applies the determined variation to the selected model feature in order to refine said model feature.

* * * * *